United States Patent
Chang et al.

(10) Patent No.: US 8,553,193 B2
(45) Date of Patent: Oct. 8, 2013

(54) PIXEL STRUCTURE AND DISPLAY PANEL HAVING THE SAME

(75) Inventors: Ke-Chih Chang, Taipei (TW); Kuo-Yu Huang, Hsinchu County (TW); Yu-Cheng Chen, Hsinchu (TW); Tsan-Chun Wang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 398 days.

(21) Appl. No.: 12/909,831

(22) Filed: Oct. 22, 2010

(65) Prior Publication Data

US 2011/0292331 A1      Dec. 1, 2011

(30) Foreign Application Priority Data

May 27, 2010  (TW) ................................ 99117022 A

(51) Int. Cl.
    *G02F 1/1343* (2006.01)
(52) U.S. Cl.
    USPC .......................................... 349/145; 349/38

(58) Field of Classification Search
    USPC ............................................. 349/38, 138, 145
    See application file for complete search history.

(56) References Cited

U.S. PATENT DOCUMENTS

| | | | |
|---|---|---|---|
| 2007/0013820 A1* | 1/2007 | Jeoung | 349/38 |
| 2008/0068525 A1* | 3/2008 | Ishii | 349/44 |
| 2009/0141222 A1 | 6/2009 | Hsu et al. | |
| 2010/0097536 A1* | 4/2010 | Iki | 349/38 |

* cited by examiner

*Primary Examiner* — Eric Wong
(74) *Attorney, Agent, or Firm* — Jianq Chyun IP Office

(57) ABSTRACT

A pixel structure includes a first and a second scan lines, a data line, a first insulating layer covering the first and the second scan lines and a portion of the data line and having a recess, a second insulating layer covering the first insulating layer, a capacitor electrode line covering the data line and the recess, a third insulating layer on the capacitor electrode line, a first active device electrically connected to the second scan line and the data line, a second active device electrically connected to the first active device and the first scan line, and a first and a second pixel electrodes electrically connected to the first and the second active devices, respectively. The portion of the data line and the first and the second scan lines are in the same layer. The recess is located at two sides of the portion of the data line.

13 Claims, 6 Drawing Sheets

PIXEL STRUCTURE AND DISPLAY PANEL HAVING THE SAME

CROSS-REFERENCE TO RELATED APPLICATION

This application claims the priority benefit of Taiwan application serial no. 99117022, filed on May 27, 2010. The entirety of the above-mentioned patent application is hereby incorporated by reference herein and made a part of this specification.

BACKGROUND OF THE PRESENT INVENTION

1. Field of the Present Invention

The present invention relates to a pixel structure. More particularly, the present invention relates to a pixel structure of a liquid crystal display (LCD) panel.

2. Description of Related Art

In general, an LCD panel is mainly comprised of an active device array substrate, an opposite substrate, and a liquid crystal layer sandwiched between the active device array substrate and the opposite substrate. The active device array substrate has a display region and a non-display region. A plurality of pixel units are arranged on the display region in an array, and each of the pixel units includes a thin film transistor (TFT) and a pixel electrode connected to the TFT. In addition, a plurality of scan lines and a plurality of data lines are disposed in the display region, and the TFT in each of the pixel units is electrically connected to the corresponding scan line and the corresponding data line. By contrast, signal lines, source drivers, and gate drivers are disposed in the non-display region.

With improvement of resolution of the LCD panel, the number of the gate drivers and the number of the source drivers in the LCD must be increased, which leads to expansion of the non-display region (also referred to as a side frame). Accordingly, manufacturing costs of the LCD are raised together with the increase in the number of the in-use gate drivers and the number of the in-use source drivers. Meanwhile, dimension of the side frame is increased as well. If the number of the in-use source drivers and/or the number of the in-use gate drivers can be reduced, the issue of high manufacturing costs of the LCD can be easily resolved, and a narrow side frame can be formed. Namely, fabrication of the LCD with a relatively small non-display region can be achieved without difficulty.

SUMMARY OF THE PRESENT INVENTION

The present invention is directed to a pixel structure and a display panel having the pixel structure. By applying the present invention, the impact on charges or signals of pixel electrodes caused by excessive parasitic capacitance between the pixel electrodes and data lines can be prevented.

In the present invention, a pixel structure including a first and a second scan lines, a data line, a first insulating layer, a second insulating layer, a capacitor electrode line, a third insulating layer, a first and a second active devices, and a first and a second pixel electrodes is provided. The first and the second scan lines are located on a substrate. The data line is disposed on the substrate and is not parallel to the first and the second scan lines. A portion of the data line, the first scan line, and the second scan line are in (or formed by) the same layer. The first insulating layer covers the portion of the data line, the first scan line, and the second scan line. The first insulating layer has a first recess located at respective sides of the portion of the data line. The second insulating layer covers the first insulating layer. The capacitor electrode line is disposed on the second insulating layer and covers the data line. The capacitor electrode line further covers the first recess of the first insulating layer. The third insulating layer is located on the capacitor electrode line. The first active device is electrically connected to the second scan line and the data line, and the second active device is electrically connected to the first active device and the first scan line. The first and the second pixel electrodes are disposed on the third insulating layer and electrically connected to the first and the second active devices, respectively.

In the present invention, a display panel including a first substrate, a second substrate, and a display medium is further provided. The first substrate has a plurality of pixel structures, and each of the pixel structures is as described above. The second substrate is located opposite to the first substrate. The display medium is located between the first substrate and the second substrate.

Based on the above, the first insulating layer of the pixel structure has the first recess located at the respective sides of a portion of the data line, and the capacitor electrode line covers the first recess of the first insulating layer. Hence, the capacitor electrode line can cover the data line, so as to reduce the parasitic capacitance between the data line and the pixel electrodes. As such, the problem of affecting charges or signals of the pixel electrodes due to an excessive parasitic capacitance between the pixel electrodes and the data line can be alleviated.

It is to be understood that both the foregoing general descriptions and the following detailed embodiments are exemplary and are, together with the accompanying drawings, intended to provide further explanation of technical features and advantages of the present invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4 is a schematic cross-sectional view of FIG. 1 taken along the sectional line B-B'.

FIG. 7 is a schematic cross-sectional view of FIG. 5 taken along the sectional line B-B'.

DESCRIPTION OF EMBODIMENTS

At present, one type of various LCD panels with the narrow side frames has a tracking gate-line in pixel (TGP) routing structure which can reduce the number of in-use gate drivers according to TW patent application number 98100467. Nonetheless, one of the drawbacks of the TGP routing structure rests in that parasitic capacitance between the pixel electrodes and the data lines is excessive when scan line signals are turned on at a converting region where scan signal transmission lines go around, which negatively poses impact on charges or signals of the pixel electrodes and further on display quality of the LCD panel.

Figure 1:
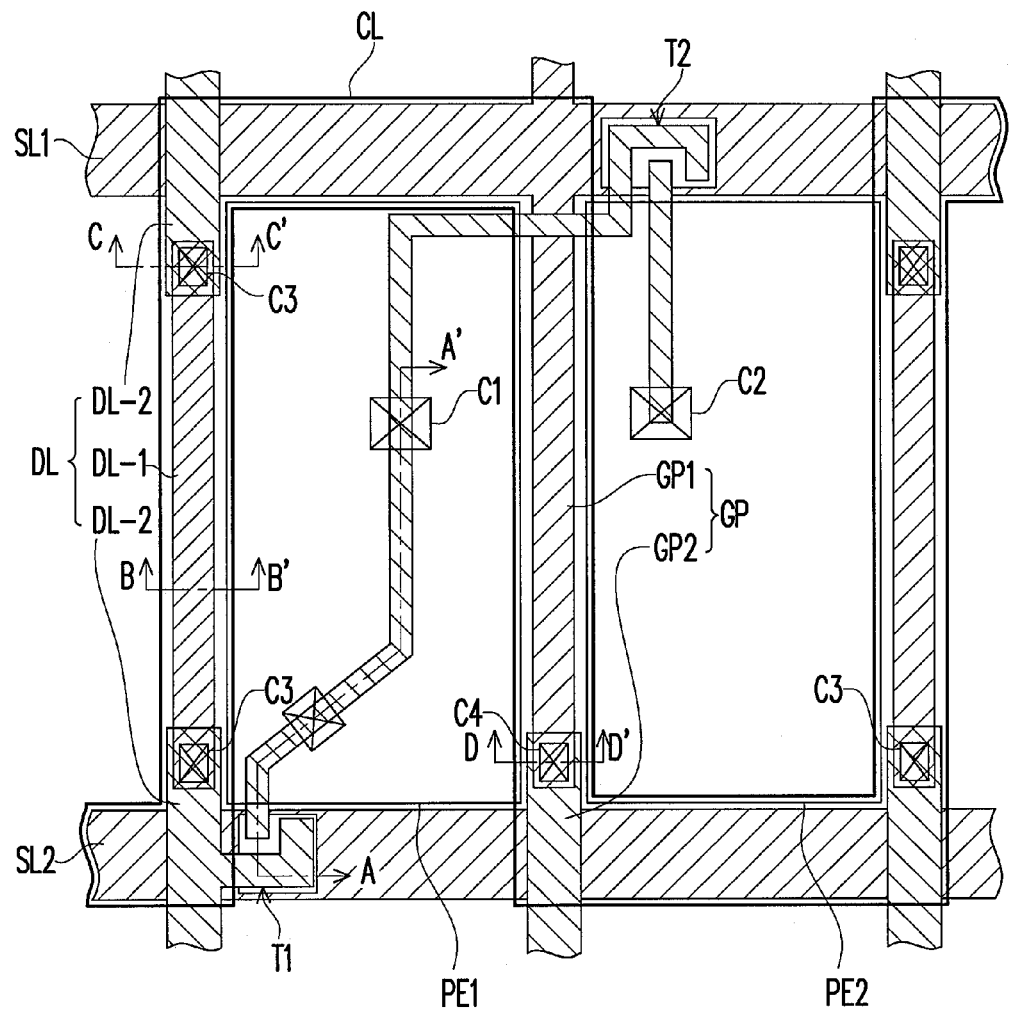
FIG. 1 is a top view illustrating a pixel structure according to an embodiment of the present invention.
Figure 2:
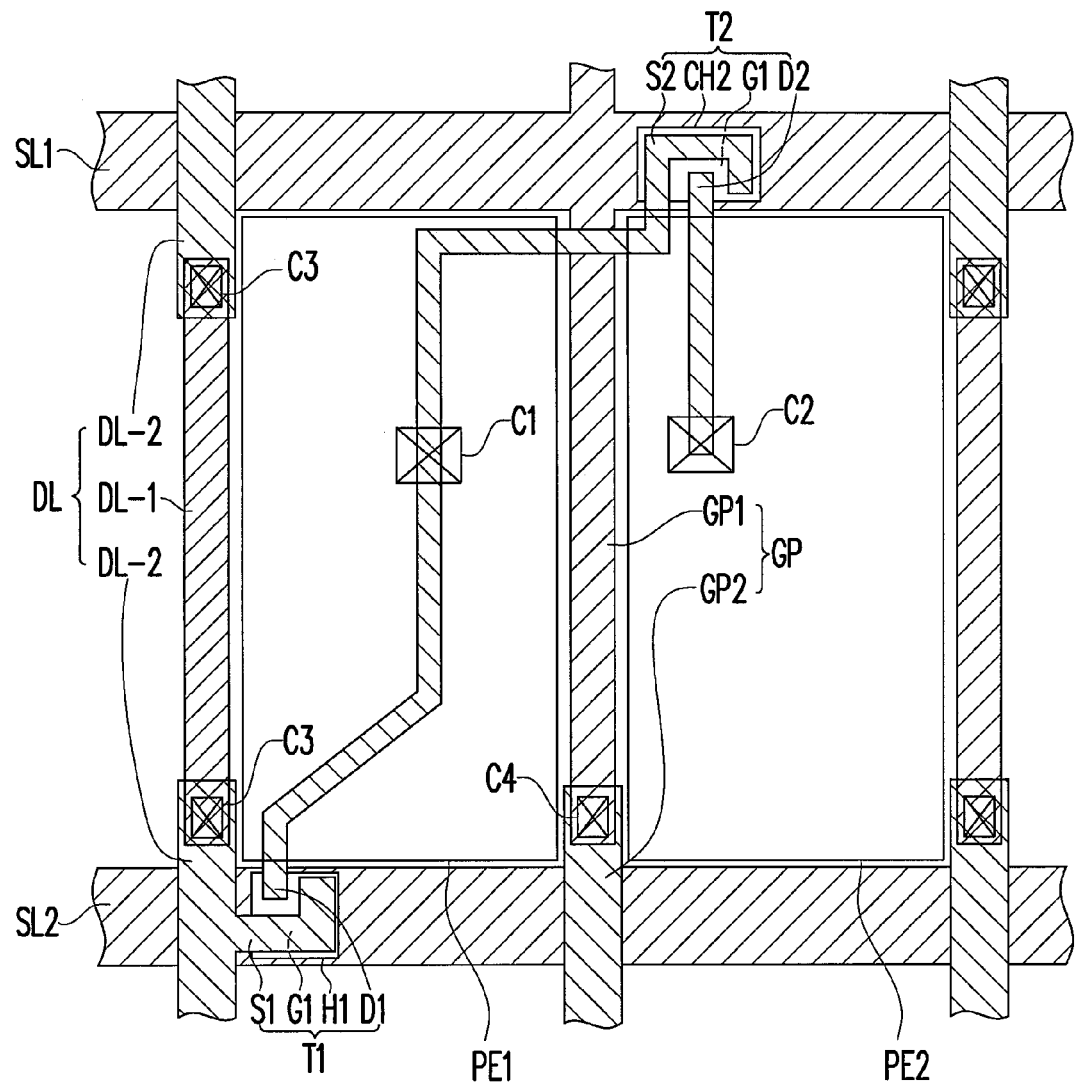
FIG. 2 is a top view illustrating the pixel structure depicted in FIG. 1 without a capacitor electrode line.
Figure 3:
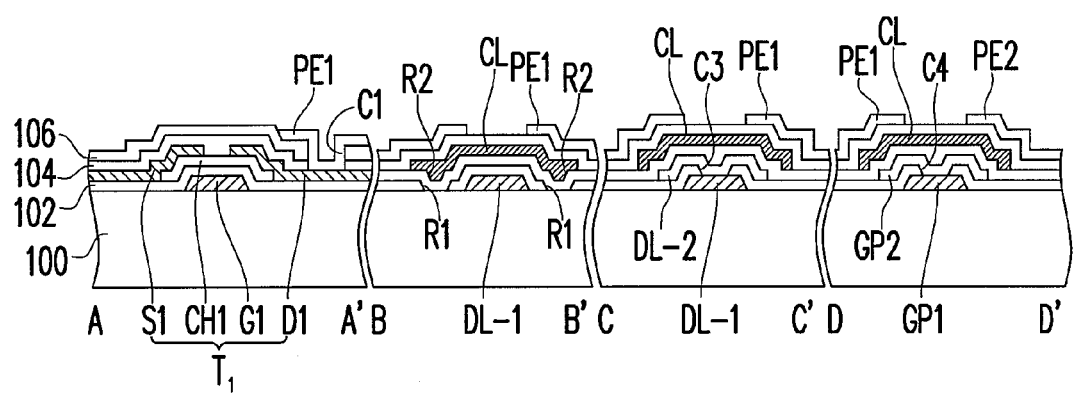
FIG. 3 is a schematic cross-sectional view of FIG. 1 taken along sectional lines A-A', B-B', C-C', and D-D'.

FIG. 1 is a top view illustrating a pixel structure according to an embodiment of the present invention. FIG. 2 is a top view illustrating the pixel structure depicted in FIG. 1 without a capacitor electrode line. FIG. 3 is a schematic cross-sectional view of FIG. 1 taken along sectional lines A-A', B-B', C-C', and D-D'. As shown in FIG. 1, FIG. 2, and FIG. 3, the pixel structure of this embodiment includes a first scan line SL1, a second scan line SL2, a data line DL, a first insulating layer 102, a second insulating layer 104, a capacitor electrode line CL, a third insulating layer 106, a first active device T1, a first pixel electrode PE1, a second active device T2, and a second pixel electrode PE2.

The first scan line SL1 and the second scan line SL2 are located on a substrate 100. The first scan line SL1 is parallel to the second scan line SL2, and the first scan line SL1 and the second scan line SL2 are directly disposed on a surface of the substrate 100. In consideration of electrical conductivity, the first scan line SL1 and the second scan line SL2 are normally made of metallic materials. Therefore, the first scan line SL1 and the second scan line SL2 can be referred to as a first metal layer. However, the first scan line SL1 and the second scan line SL2 can also be made of other conductive materials in other embodiments, which should not be construed as a limitation to the present invention.

The data line DL is disposed on the substrate 100, and the data line DL is not parallel to the first scan line SL1 and the second scan line SL2. Particularly, a portion of the data line DL, the first scan line SL1, and the second scan line SL2 are in (formed by) the same film layer. In this embodiment, the data line DL includes at least a first data line segment DL-1 and at least a second data line segment DL-2. The first data line segment DL-1, the first scan line SL1, and the second scan line SL2 are in (formed by) the same film layer, and therefore the first data line segment DL-1 also belongs to the first metal layer. Note that the first data line segment DL-1 is not electrically connected to the first scan line SL1 and the second scan line SL2. That is to say, the first data line segment DL-1 is separated from the first scan line SL1 and the second scan line SL2. Besides, the second data line segment DL-2 crosses over the first scan line SL1 and the second scan line SL2. In other words, an insulating layer (e.g. the first insulating layer 102) is sandwiched between the second data line segment DL-2 and the first and the second scan lines SL1 and SL2, such that the second data line segment DL-2 is electrically insulated from the first and the second scan lines SL1 and SL2. Additionally, in this embodiment, the first data line segment DL-1 and the second data line segment DL-2 are electrically connected to each other through a contact window C3. Namely, the contact window C3 is located in the insulating layer (e.g. the first insulating layer 102) where the first data line segment DL-1 and the second data line segment DL-2 are overlapped, so as to electrically connect the first data line segment DL-1 and the second data line segment DL-2. In consideration of electrical conductivity, the data line DL is normally made of a metallic material, and therefore the second data line segment DL-2 of the data line DL can be referred to as a second metal layer. However, the data line DL can also be made of other conductive materials in other embodiments, which should not be construed as a limitation to the present invention.

If the pixel structure of the present invention is applied to an LCD panel with narrow side frames, the pixel structure can further include a scan signal transmission line GP. The scan signal transmission line GP mainly changes an extending direction of the scan lines to a direction parallel to the data line, so as to reduce the number of in-use gate drivers. Therefore, the scan signal transmission line GP is not parallel to the first scan line SL1 and the second scan line SL2, and the scan signal transmission line GP is electrically connected to the first scan line SL1. In this embodiment, the scan signal transmission line GP includes at least a first scan signal transmission line segment GP1 and at least a second scan signal transmission line segment GP2. The first scan signal transmission line segment GP1, the first scan line SL1, and the second scan line SL2 are in (formed by) the same film layer. Accordingly, the first scan signal transmission line segment GP1 also belongs to the first metal layer. Namely, the first scan signal transmission line segment GP1 and the first scan line SL1 can be directly connected to each other. In addition, the second scan signal transmission line segment GP2 crosses over the second scan line SL2. Namely, an insulating layer (e.g. the first insulating layer 102) is sandwiched between the second scan signal transmission line segment GP2 and the second scan line SL2, such that the second scan signal transmission line segment GP2 is electrically insulated from the second scan line SL2. Additionally, in this embodiment, the first scan signal transmission line segment GP1 and the second scan signal transmission line segment GP2 are electrically connected through a contact window C4. That is to say, the contact window C4 is located in the insulating layer (e.g. the first insulating layer 102) where the first scan signal transmission line segment GP1 and the second scan signal transmission line segment GP2 are overlapped, so as to electrically connect the first scan signal transmission line segment GP1 and the second scan signal transmission line segment GP2. In consideration of electrical conductivity, the scan signal transmission line GP is normally made of a metallic material, and thus the second scan signal transmission line segment GP2 of the scan signal transmission line GP can be referred to as the second metal layer. However, the scan signal transmission line GP can also be made of other conductive materials in other embodiments, which should not be construed as a limitation to the present invention.

The first active device T1 is electrically connected to the second scan line SL2 and the data line DL. In this embodiment, the first active device T1 includes a gate G1, a channel CH1, a source S1, and a drain D1. The gate G1 is electrically connected to the second scan line SL2. The channel CH1 is located above the gate G1. The source S1 and the drain D1 are located above the channel CH1, and the source S1 is electrically connected to the data line DL.

The second active device T2 is electrically connected to the first scan line SL1 and the first active device T1. In this embodiment, the second active device T2 includes a gate G2, a channel CH2, a source S2, and a drain D2. The gate G2 is electrically connected to the first scan line SL1. The channel CH2 is located above the gate G2. The source S2 and the drain D2 are located above the channel CH2, and the source S2 is electrically connected to the drain D1 of the first active device T1.

The first active device T1 and the second active device T2 are bottom-gate TFTs, for example, while the first active device T1 and the second active device T2 are not limited to the bottom-gate TFTs in the present invention. According to other embodiments, the first active device T1 and the second active device T2 are top-gate TFTs.

The first insulating layer 102 covers the first scan line SL1, the second scan line SL2, and the first data line segment DL-1 of the data line DL. Specifically, the first insulating layer 102 has a first recess R1 located at respective sides of the first data line segment DL-1 of the data line DL, as shown in FIG. 3. In this embodiment, the first recess R1 of the first insulating layer 102 exposes the surface of the substrate 100, for instance. Besides, the first insulating layer 102 further includes the contact windows C3 and C4. As described above, the contact window C3 is located in a region where the first data line segment DL-1 and the second data line segment DL-2 are overlapped, so as to electrically connect the first data line segment DL-1 and the second data line segment DL-2. The contact window C4 is located in a region where the first scan signal transmission line segment GP1 and the second scan signal transmission line segment GP2 are overlapped, so as to electrically connect the first scan signal transmission line segment GP1 and the second scan signal transmission line segment GP2. Since the first insulating layer 102 covers the gate G1 of the first active device T1 and the gate G2 of the second active device T2, the first insulating layer 102 can be referred to as a gate insulating layer.

The second insulating layer 104 covers the first insulating layer 102. The second insulating layer 104 in this embodiment conformably covers a surface of the first insulating layer 102, such that the second insulating layer 104 has a second recess R2 correspondingly formed above the first recess R1 of the first insulating layer 102. Besides, the second insulating layer 104 further covers the first active device T1, the second active device T2, the second data line segment DL-2 of the data line DL, and the second scan signal transmission line segment GP2 of the scan signal transmission line GP. Thus, the second insulating layer 104 can be referred to as a passivation layer.

The capacitor electrode line CL is located on the second insulating layer 104 and covers the data line DL. In this embodiment, the capacitor electrode line CL is disposed on the second insulating layer 104 which is located above the data line DL, a portion of the first scan line SL1, and a portion of the second scan line SL2. The capacitor electrode line CL as arranged in this embodiment not only can serve as an electrode line of a storage capacitor but also can attenuate or block light leakage caused by tilted liquid crystal molecules around the scan lines and the data line in the LCD panel. However, in the present invention, the arrangement of the capacitor electrode line CL is not limited to that depicted in FIG. 1. The capacitor electrode line CL can be arranged in other manner according to other embodiments. In consideration of electrical conductivity, the capacitor electrode line CL is normally made of a metallic material, and therefore the capacitor electrode line CL can be referred to as a third metal layer. However, the capacitor electrode line CL can also be made of other conductive materials in other embodiments, which should not be construed as a limitation to the present invention.

Note that the capacitor electrode line CL further covers the first recess R1 of the first insulating layer 102, as shown in FIG. 3. To be more specific, the capacitor electrode line CL covers the second insulating layer 104 and a surface of the second recess R2 of the second insulating layer 104. In an alternative, a portion of the capacitor electrode line CL is located in the second recess R2. In this embodiment, the first insulating layer 102 has the first recess R1, and the second insulating layer 104 has the second recess R2 correspondingly formed above the first recess R1 of the first insulating layer 102. Therefore, the second recess R2 is filled with the capacitor electrode line CL on the second insulating layer 104, and the first data line segment DL-1 of the data line DL is almost fully wrapped or covered by the capacitor electrode line CL.

The third insulating layer 106 is located on the capacitor electrode line CL. The third insulating layer 106 also covers the first active device T1, the second active device T2, the data line DL, and the scan signal transmission line GP, and therefore the third insulating layer 106 can be referred to as a passivation layer.

The first pixel electrode PE1 is located on the third insulating layer 106 and electrically connected to the first active device T1. In this embodiment, the first pixel electrode PE2 and the first active device T1 are electrically connected through a contact window C1. Particularly, the contact window C1 is formed in the second insulating layer 104 and the third insulating layer 106. Besides, the contact window C1 is electrically connected to the first pixel electrode PE1 and the drain D1 of the first active device T1. The first pixel electrode PE1 is located above the capacitor electrode line CL. Thus, coupling capacitance is generated by the first pixel electrode PE1 and the capacitor electrode line CL, so as to form a storage capacitor.

The second pixel electrode PE2 is located on the third insulating layer 106 and electrically connected to the second active device T2. In this embodiment, the second pixel electrode PE2 and the second active device T2 are electrically connected through a contact window C2. Particularly, the contact window C2 is formed in the second insulating layer 104 and the third insulating layer 106. Besides, the contact window C2 is electrically connected to the second pixel electrode PE2 and the drain D2 of the second active device T2. The second pixel electrode PE2 is located above the capacitor electrode line CL. Thus, coupling capacitance is generated by the second pixel electrode PE2 and the capacitor electrode line CL, so as to form a storage capacitor.

It should be mentioned that the first active device T1 and the second active device T2 in the pixel structure of this embodiment share the same data line DL. Hence, it is not necessary to form another data line between the first pixel electrode PE1 and the second pixel electrode PE2. Instead, the scan signal transmission line GP can be disposed between the first pixel electrode PE1 and the second pixel electrode PE2.

As mentioned above, the first data line segment DL-1 of the data line DL is almost fully covered by the capacitor electrode line CL. Therefore, the capacitor electrode line CL can act as a shielding layer between the first data line segment DL-1 of the data line DL and the first pixel electrode PE1/the second pixel electrode PE2. A common voltage (Vcom) is normally applied to the capacitor electrode line CL, and thereby the capacitor electrode line CL can effectively attenuate the parasitic capacitance generated between the first data line segment DL-1 of the data line DL and the first pixel electrode PE1/the second pixel electrode PE2. As such, the problem of affecting charges or signals of the first pixel electrode PE1/the second pixel electrode PE2 due to the parasitic capacitance can be alleviated.

In the embodiment illustrated in FIG. 3, the first recess R1 is formed in the first insulating layer 102. The second insulating layer 104 conformably covers the first insulating layer 102, and the second insulating layer 104 has the second recess R2 correspondingly formed above the first recess R1 of the first insulating layer 102. Therefore, the second recess R2 is filled with the capacitor electrode line CL on the second insulating layer 104, such that the first data line segment DL-1 of the data line DL is almost fully covered by the capacitor electrode line CL. However, in other embodiments, the second recess R2 can also be directly formed in the second insulating layer 104, as indicated in FIG. 4.

Figure 4:
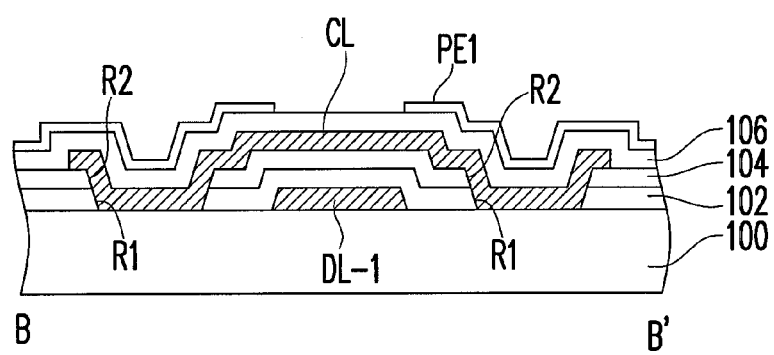
FIG. 4 is a schematic partial cross-sectional view illustrating a pixel structure according to another embodiment of the present invention. Specifically.

FIG. 4 is a schematic cross-sectional view illustrating the pixel structure depicted in FIG. 1 taken along the sectional line B-B'. Namely, the pixel structure of this embodiment is similar to that in the previous embodiment, while the difference therebetween lies in the cross-section taken along the sectional line B-B'. As indicated in FIG. 4, the second insulating layer 104 of this embodiment has the second recess R2 located above the first recess R1. More particularly, the first recess R1 of the first insulating layer 102 exposes the surface of the substrate 100, and so does the second recess R2 of the second insulating layer 104. That is to say, there exist the recesses where the first insulating layer 102 and the second insulating layer 104 are stacked. Hence, the capacitor electrode line CL1 formed on the second insulating layer 104 conformably covers the surface of the second insulating layer 104, the surface of the first recess R1, and the surface of the second recess R2. The capacitor electrode line CL comes into contact with the surface of the substrate 100.

In the embodiment depicted in FIG. 4, the capacitor electrode line CL comes into contact with the surface of the substrate 100 at the first recess R1 and the second recess R2, and thus the first data line segment DL-1 of the data line DL can be completely covered by the capacitor electrode line CL. As such, the capacitor electrode line CL can act as a shielding layer between the first data line segment DL-1 of the data line DL and the first pixel electrode PE1/the second pixel electrode PE2. Likewise, the common voltage (Vcom) is applied to the capacitor electrode line CL, and thereby the capacitor electrode line CL can effectively attenuate the parasitic capacitance generated between the first data line segment DL-1 of the data line DL and the first pixel electrode PE1/the second pixel electrode PE2. As such, the problem of affecting charges or signals of the first pixel electrode PE1/the second pixel electrode PE2 due to the parasitic capacitance can be alleviated.

Figure 5:
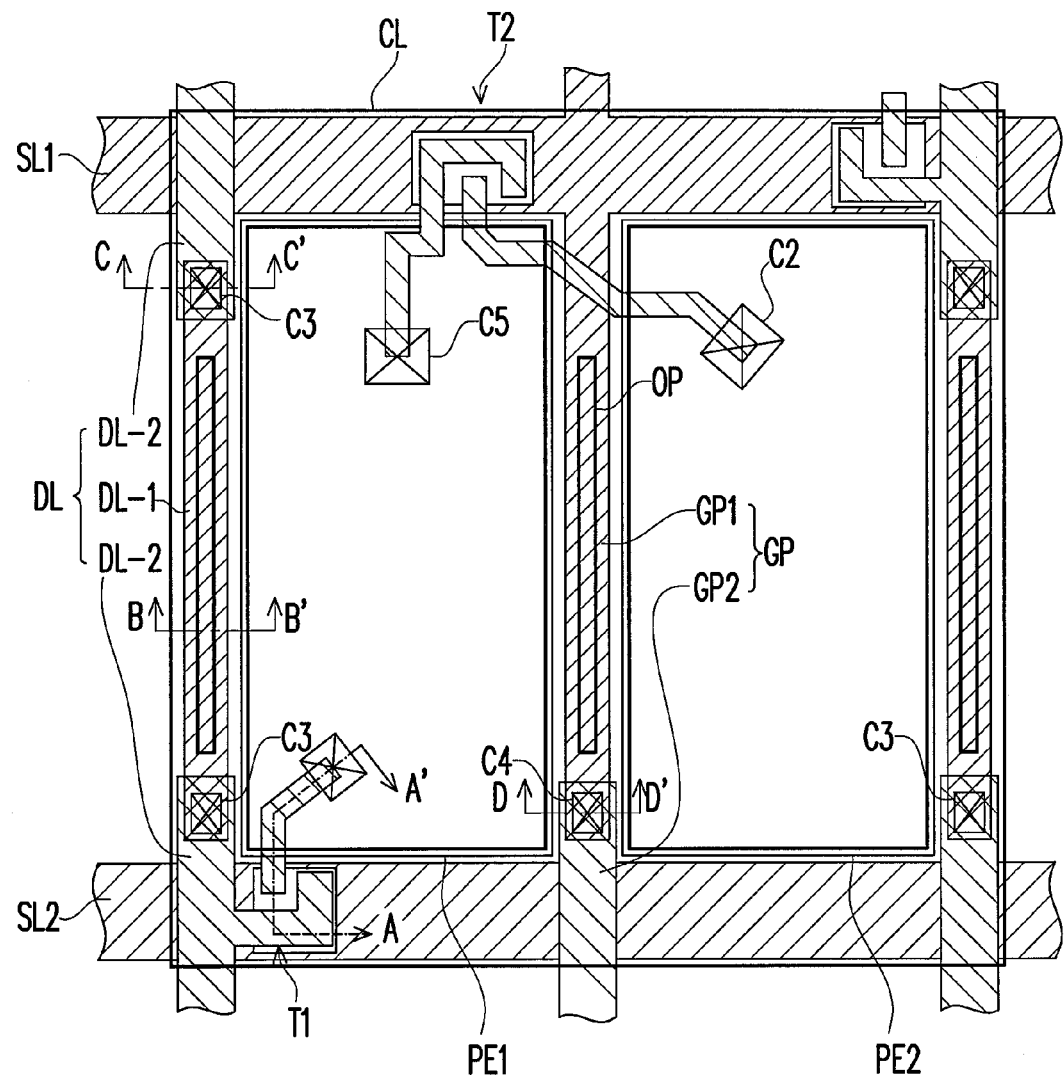
FIG. 5 is a top view illustrating a pixel structure according to still another embodiment of the present invention.
Figure 6:
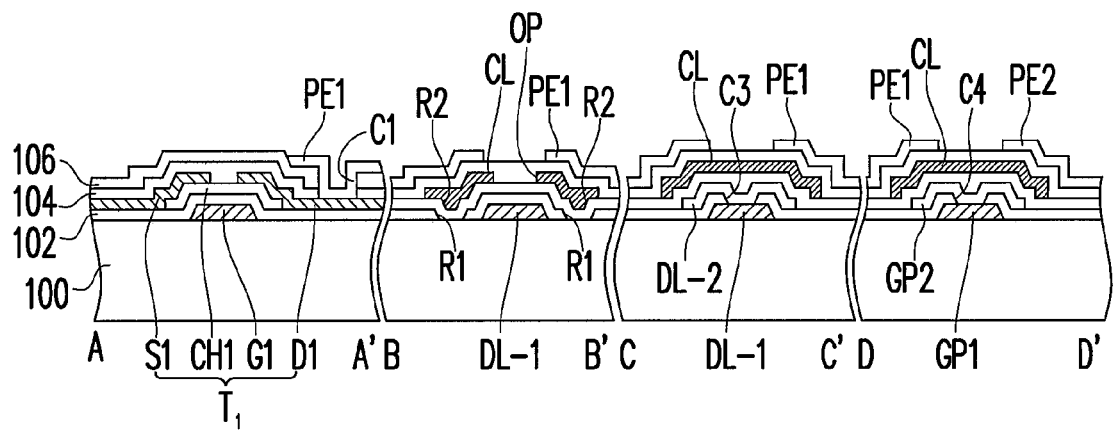
FIG. 6 is a schematic cross-sectional view of FIG. 5 taken along the sectional lines A-A', B-B', C-C', and D-D'.

The pixel structure depicted in FIG. 1 serves as an example in the aforesaid embodiments, which should however not be construed as a limitation to the present invention. That is to say, according to other embodiments, the pixel structure of the present invention can be arranged in other ways. FIG. 5 is a top view illustrating a pixel structure according to still another embodiment of the present invention. FIG. 6 is a schematic cross-sectional view of FIG. 5 taken along the sectional lines A-A', B-B', C-C', and D-D'. Note that components in the pixel structure depicted in FIG. 5 and FIG. 6 are substantially the same as the components in the pixel structure depicted in FIG. 1 and FIG. 2; therefore, the same components are represented by the same reference numbers. Relevant descriptions that have been provided hereinbefore with reference to FIG. 1 are not provided hereinafter, and the difference between the pixel structure depicted in FIG. 5 and FIG. 6 and the pixel structure depicted in FIG. 1 and FIG. 2 is elaborated below. As shown in FIG. 5, the pixel structure of this embodiment includes a first scan line SL1, a second scan line SL2, a data line DL, a first insulating layer 102, a second insulating layer 104, a capacitor electrode line CL, a third insulating layer 106, a first active device T1, a first pixel electrode PE1, a second active device T2, and a second pixel electrode PE2.

The first active device T1 is electrically connected to the second scan line SL2 and the data line DL. In this embodiment, the first active device T1 includes a gate G1, a channel CH1, a source S1, and a drain D1. The gate G1 is electrically connected to the second scan line SL2. The channel CH1 is located above the gate G1. The source S1 and the drain D1 are located above the channel CH1, and the source S1 is electrically connected to the data line DL.

The second active device T2 is electrically connected to the first scan line SL1 and the first active device T1. In this embodiment, the second active device T2 includes a gate G2, a channel CH2, a source S2, and a drain D2. The gate G2 is electrically connected to the first scan line SL1. The channel CH2 is located above the gate G2. The source S2 and the drain D2 are located above the channel CH2. The source S2 is electrically connected to the first pixel electrode PE1 through a contact window C5. The first pixel electrode PE1 is electrically connected to the drain D1 of the first active device T1 through a contact window C1, and thus the second active device T2 is electrically connected to the first active device T1.

With reference to FIG. 5 and FIG. 6, in this embodiment, the first pixel electrode PE1 and the first active device T1 are electrically connected through the contact window C1. Particularly, the contact window C1 is formed in the second insulating layer 104 and the third insulating layer 106. Besides, the contact window C1 is electrically connected to the first pixel electrode PE1 and the drain D1 of the first active device T1. The second pixel electrode PE2 and the second active device T2 are electrically connected through a contact window C2. Particularly, the contact window C2 is formed in the second insulating layer 104 and the third insulating layer 106. Besides, the contact window C2 is electrically connected to the second pixel electrode PE2 and the drain D2 of the second active device T2.

Figure 7:
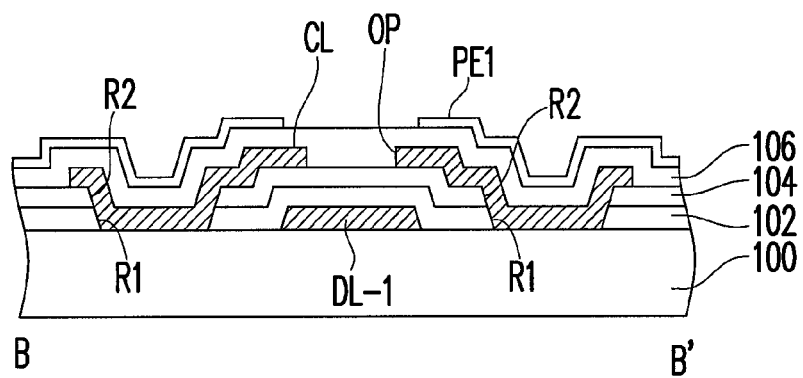
FIG. 7 is a schematic partial cross-sectional view illustrating a pixel structure according to still another embodiment of the present invention. Specifically.

In this embodiment, the capacitor electrode line CL, for example, has a mesh structure and an opening OP. The capacitor electrode line CL is located on the second insulating layer 104 and covers a portion of the data line DL. In this embodiment, the capacitor electrode line CL is disposed on the second insulating layer 104 which is located above the data line DL, the first scan line SL1, and the second scan line SL2. Note that the capacitor electrode line CL further covers the first recess R1 of the first insulating layer 102, as shown in FIG. 6. To be more specific, the capacitor electrode line CL covers a surface of the second insulating layer 104 and a surface of the second recess R2 of the second insulating layer 104. In this embodiment, the first insulating layer 102 has the first recess R1, and the second insulating layer 104 has the second recess R2 correspondingly formed above the first recess R1 of the first insulating layer 102. Therefore, the second recess R2 is filled with the capacitor electrode line CL on the second insulating layer 104, and a portion of the data line DL is covered by the capacitor electrode line CL. Moreover, in other embodiments, the second recess R2 can also be directly formed in the second insulating layer 104, as indicated in FIG. 7. In the embodiment depicted in FIG. 7, the capacitor electrode line CL comes into contact with the surface of the substrate 100 at the first recess R1 and the second recess R2, and thus the respective sides of the first data line segment DL-1 can be further wrapped or covered by the capacitor electrode line CL.

As mentioned above, a portion of the data line DL is covered by the capacitor electrode line CL. Therefore, the capacitor electrode line CL can act as a shielding layer between the first data line segment DL-1 of the data line DL and the first pixel electrode PE1/the second pixel electrode PE2.

Figure 8:
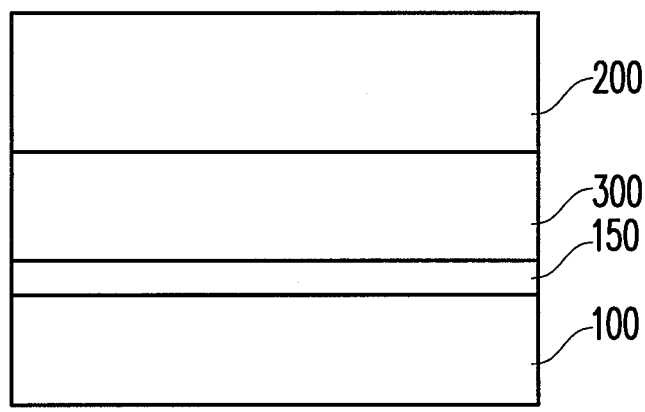
FIG. 8 is a schematic view illustrating a display panel according to an embodiment of the present invention.

FIG. 8 is a schematic view illustrating a display panel according to an embodiment of the present invention. With reference to FIG. 8, the display panel of this embodiment includes a first substrate 100, a second substrate 200, and a display medium sandwiched between the first and the second substrates 100 and 200.

The first substrate 100 can be made of glass, quartz, organic polymer, or metal. A pixel array layer 150 is disposed on the first substrate 100 and formed by a plurality of pixel structures. The pixel structures in the pixel array layer 150 can be the pixel structure depicted in FIG. 1 and FIG. 3, the pixel structure depicted in FIG. 1 and FIG. 4, the pixel structure depicted in FIG. 5 and FIG. 6, or the pixel structure depicted in FIG. 5 and FIG. 7. The second substrate 200 can be made of glass, quartz, or organic polymer. In an embodiment, an electrode layer (not shown) can be disposed on the second substrate 200. The electrode layer is a transparent conductive layer, and a material of the electrode layer includes metal oxide, e.g. indium tin oxide or indium zinc oxide. Besides, the electrode layer fully covers the second substrate 200. On the other hand, a color filter array (not shown) including red, green, and blue color filter patterns can be further formed on the second substrate 200 according to another embodiment of the present invention. Moreover, a light shielding pattern layer (not shown) which is also referred to as a black matrix can be further disposed on the second substrate 200 and arranged between the patterns of the color filter array. The display medium 300 can include liquid crystal molecules or an electrophoretic display medium.

In light of the foregoing, the data line of the present invention is covered by the capacitor electrode line. Therefore, the capacitor electrode line can act as a shielding layer between the data line and the pixel electrodes. Moreover, the common voltage is applied to the capacitor electrode line, and thereby the capacitor electrode line can effectively attenuate the parasitic capacitance generated between the data line and the pixel electrodes. As such, the problem of affecting charges or signals of the pixel electrodes due to the parasitic capacitance can be alleviated. In conclusion, the display panel having the aforesaid pixel structure can accomplish favorable display quality.

It will be apparent to those skilled in the art that various modifications and variations can be made to the structure of the present invention without departing from the scope or spirit of the present invention. In view of the foregoing, it is intended that the present invention cover modifications and variations of the present invention provided they fall within the scope of the following claims and their equivalents.

What is claimed is:

1. A pixel structure located on a substrate, comprising:
    a first scan line and a second scan line;
    a scan signal transmission line, electrically connected to the first scan line, wherein the scan signal transmission line is not parallel to the first scan line and the second scan line;
    a data line which is not parallel to the first scan line and the second scan line, wherein a portion of the data line, the first scan line, and the second scan line are formed by a same layer;
    a first insulating layer covering the portion of the data line, the first scan line, and the second scan line, the first insulating layer having a first recess located at respective sides of the portion of the data line;
    a second insulating layer covering the first insulating layer;
    a capacitor electrode line located on the second insulating layer and covering the data line, the capacitor electrode line further covering the first recess of the first insulating layer;
    a third insulating layer located on the capacitor electrode line;
    a first active device electrically connected to the second scan line and the data line;
    a first pixel electrode located on the third insulating layer and electrically connected to the first active device;
    a second active device electrically connected to the first scan line and the first active device; and
    a second pixel electrode located on the third insulating layer and electrically connected to the second active device.

2. The pixel structure as claimed in claim 1, wherein the first recess of the first insulating layer exposes a surface of the substrate.

3. The pixel structure as claimed in claim 1, wherein the second insulating layer conformably covers a surface of the first insulating layer, such that the second insulating layer has a second recess formed above the first recess.

4. The pixel structure as claimed in claim 3, wherein the capacitor electrode line covers a surface of the second insulating layer and a surface of the second recess.

5. The pixel structure as claimed in claim 1, wherein the second insulating layer has a second recess located above the first recess.

6. The pixel structure as claimed in claim 5, wherein the first recess and the second recess expose a surface of the substrate.

7. The pixel structure as claimed in claim 5, wherein the capacitor electrode line covers a surface of the second insulating layer, a surface of the first recess, and a surface of the second recess.

8. The pixel structure as claimed in claim 1, the data line comprising at least a first data line segment and at least a second data line segment, wherein the at least a first data line segment, the first scan line, and the second scan line are formed by a same layer and are not electrically connected to one another, and the at least a second data line segment crosses over the first scan line and the second scan line.

9. The pixel structure as claimed in claim 8, further comprising a contact window located at a region where the at least a first data line segment and the at least a second data line segment are overlapped.

10. The pixel structure as claimed in claim 1, the scan signal transmission line comprising at least a first scan signal transmission line segment and at least a second scan signal transmission line segment, wherein the at least a first scan signal transmission line segment, the first scan line, and the second scan line are in a same layer, the at least a first scan signal transmission line segment is directly connected to the first scan line, and the at least a second scan signal transmission line segment crosses over the second scan line.

11. The pixel structure as claimed in claim 1, wherein the scan signal transmission line is located between the first pixel electrode and the second pixel electrode.

12. A display panel comprising:
    a first substrate having a plurality of pixel structures, wherein each of the pixel structures is as claimed in claim 1;
    a second substrate located opposite to the first substrate; and
    a display medium located between the first substrate and the second substrate.

13. A pixel structure located on a substrate, comprising:
    a first scan line and a second scan line;
    a data line which is not parallel to the first scan line and the second scan line, wherein a portion of the data line, the first scan line, and the second scan line are formed by a same layer;

a first insulating layer covering the portion of the data line, the first scan line, and the second scan line, the first insulating layer having a first recess located at respective sides of the portion of the data line;

a second insulating layer covering the first insulating layer, wherein the second insulating layer has a second recess located above the first recess, and the first recess and the second recess expose a surface of the substrate;

a capacitor electrode line located on the second insulating layer and covering the data line, the capacitor electrode line further covering the first recess of the first insulating layer;

a third insulating layer located on the capacitor electrode line;

a first active device electrically connected to the second scan line and the data line;

a first pixel electrode located on the third insulating layer and electrically connected to the first active device;

a second active device electrically connected to the first scan line and the first active device; and a second pixel electrode located on the third insulating layer and electrically connected to the second active device.

* * * * *